(12) United States Patent
Abrahamson et al.

(10) Patent No.: US 10,096,819 B2
(45) Date of Patent: Oct. 9, 2018

(54) METHOD FOR FORMING AN ELECTRICAL CONNECTION TO A CONDUCTIVE FIBRE ELECTRODE AND ELECTRODE SO FORMED

(71) Applicant: ArcActive Limited, Christchurch (NZ)

(72) Inventors: John Abrahamson, Christchurch (NZ); Suzanne Furkert, Christchurch (NZ); Shane Christie, Christchurch (NZ); Yoon San Wong, Christchurch (NZ)

(73) Assignee: ARCACTIVE LIMITED, Christchurch (NZ)

( * ) Notice: Subject to any disclaimer, the term of this patent is extended or adjusted under 35 U.S.C. 154(b) by 601 days.

(21) Appl. No.: 14/429,973

(22) PCT Filed: Sep. 20, 2013

(86) PCT No.: PCT/NZ2013/000174
§ 371 (c)(1),
(2) Date: Mar. 20, 2015

(87) PCT Pub. No.: WO2014/046556
PCT Pub. Date: Mar. 27, 2014

(65) Prior Publication Data
US 2015/0255783 A1    Sep. 10, 2015

Related U.S. Application Data

(60) Provisional application No. 61/703,442, filed on Sep. 20, 2012, provisional application No. 61/857,729, filed on Jul. 24, 2013.

(51) Int. Cl.
*H01M 4/02* (2006.01)
*H01M 4/22* (2006.01)
(Continued)

(52) U.S. Cl.
CPC .............. *H01M 4/22* (2013.01); *B22D 19/14* (2013.01); *B23K 20/002* (2013.01); *B23K 20/02* (2013.01);
(Continued)

(58) Field of Classification Search
CPC ........ B22D 19/14; H01M 2/28; H01M 4/663; H01M 4/747; H01M 4/82; H01M 10/06; H01M 10/12; H01M 2/30; H01M 4/0404; H01M 4/0433; H01M 4/22; H01M 2/266; H01M 2220/20; C22C 47/066; C22C 47/12; B23K 20/002; B23K 20/02; Y02E 60/126
(Continued)

(56) References Cited

U.S. PATENT DOCUMENTS

2012/0021281 A1*   1/2012   Kelley ................... H01M 2/28
                                                    429/211

* cited by examiner

*Primary Examiner* — Gary Harris
(74) *Attorney, Agent, or Firm* — Dann, Dorfman, Herrell and Skillman, P.C.

(57) ABSTRACT

A method for forming an electrical connection to a microscale electrically conductive fiber material electrode element, such as a carbon fiber electrode element of a Pb-acid battery, comprises pressure impregnating into the fiber material an electrically conductive lug material, such as molten Pb metal, to surround and/or penetrate fibers and form an electrical connection to the fiber material and provide a lug for external connection of the electrode element. Other methods of forming a lug for external connection are also disclosed.

8 Claims, 14 Drawing Sheets

(51) Int. Cl.

| | |
|---|---|
| *B22D 19/14* | (2006.01) |
| *C22C 47/06* | (2006.01) |
| *C22C 47/12* | (2006.01) |
| *H01M 2/26* | (2006.01) |
| *H01M 2/28* | (2006.01) |
| *H01M 4/66* | (2006.01) |
| *H01M 4/74* | (2006.01) |
| *H01M 4/82* | (2006.01) |
| *H01M 10/06* | (2006.01) |
| *H01M 10/12* | (2006.01) |
| *B23K 20/00* | (2006.01) |
| *B23K 20/02* | (2006.01) |
| *H01M 2/30* | (2006.01) |
| *H01M 4/04* | (2006.01) |

(52) U.S. Cl.
CPC ............ *C22C 47/066* (2013.01); *C22C 47/12* (2013.01); *H01M 2/266* (2013.01); *H01M 2/28* (2013.01); *H01M 2/30* (2013.01); *H01M 4/0404* (2013.01); *H01M 4/0433* (2013.01); *H01M 4/663* (2013.01); *H01M 4/747* (2013.01); *H01M 4/82* (2013.01); *H01M 10/06* (2013.01); *H01M 10/12* (2013.01); *H01M 2220/20* (2013.01); *Y02E 60/126* (2013.01)

(58) Field of Classification Search
USPC .......................................................... 429/211
See application file for complete search history.

METHOD FOR FORMING AN ELECTRICAL CONNECTION TO A CONDUCTIVE FIBRE ELECTRODE AND ELECTRODE SO FORMED

FIELD OF THE INVENTION

The invention relates to an improved method for forming an electrical connection to a conductive fibre electrode, such as battery or cell conductive fibre electrode, and to an electrode so formed.

BACKGROUND

In a lead-acid battery or cell comprising a carbon fibre electrode or electrodes, a very low electrical resistance and mechanically durable connection is required between the carbon fibre electrode material and a connector or lug (herein generally referred to as lug) to the external circuit. This can be difficult to achieve particularly when the carbon fibre electrode material has an interfibre spacing of less than 100 microns, for reasons that include that carbon strongly repels metal from its surface and/or the need to overcome surface tension to enable lug metal to penetrate between the carbon fibres (whether interfibre or intrafibre i.e. the latter referring to between filaments of individual fibres if the carbon fibres are multifilamentary).

Achieving high penetration between fibres to minimise remaining voidage between the lug material and the fibres of the lug connection is also important as one way of preventing battery electrolyte from subsequently entering the lug to fibre connection and deteriorating the connection.

U.S. Pat. No. 3,926,674 discloses a method for manufacturing electrical connection elements on battery electrodes of glass fibre by molten lead injection.

SUMMARY OF INVENTION

In broad terms in one aspect the invention comprises a method for forming an electrical connection to an electrically conductive fibre material electrode element having an average interfibre spacing less than about 100 microns, which comprises pressure impregnating into a lug zone part of the fibre material, an electrically conductive lug material to surround and/or penetrate fibres of the fibre material and form an electrical connection to the fibre material in said lug zone and provide a lug for external connection of the electrode element.

In broad terms in another aspect the invention comprises an electrically conductive fibre material electrode element having an average interfibre spacing less than about 100 microns, which comprises an electrically conductive lug material pressure impregnated into a lug zone part of the fibre material and surrounding and/or penetrating the fibres and forming an electrical connection to the fibre material in said lug zone and providing a lug for external connection of the electrode element.

In broad terms in another aspect the invention comprises an electrode of a lead acid battery or cell, or a lead-acid battery or cell comprising at least one electrode, comprising a conductive fibre material having an average interfibre spacing less than about 100 microns, the electrode comprising an active area and a conductive element in a lug zone as a connector to the electrode, in which the electrical resistance of the connection when the battery or cell is at about 10% charged/90% discharged is less than the resistance of the active area (when fully charged) by at least 10%.

In broad terms in another aspect the invention comprises an electrode of a lead acid battery or cell, or a lead-acid battery or cell comprising at least one electrode, comprising an electrically conductive fibre material having an average interfibre spacing less than about 100 microns, the electrode comprising an active area and a conductive lug element in a lug zone as a connector to the electrode, in which in the lug zone part of the fibre material, lug material surrounds and/or penetrates and electrically connects to the fibres.

In broad terms in another aspect the invention comprises an electrode of a lead acid battery or cell or a lead-acid battery or cell comprising at least one electrode, comprising a 3-dimensional matrix of electrically conductive material extending between an active area of said electrode and a lug zone as a connector to the electrode, in which in the lug zone part of the conductive material, lug material surrounds and/or penetrates and electrically connects to the conductive material and reduces voidage compared to voidage in the active area.

In some embodiments the resistance of the lug connection when the battery is fully discharged is at least 10% lower than the resistance of the active area.

In broad terms in another aspect the invention comprises an electrode of a lead acid battery or cell or a lead-acid battery or cell comprising at least one electrode, comprising a 3-dimensional matrix of electrically conductive material extending between an active area of said electrode and a lug zone as a connector to the electrode, in which in the lug zone part of the conductive material, lug material surrounds and/or penetrates and electrically connects to the conductive material and reduces voidage compared to voidage in the active area.

In some embodiments the collective resistance between the conductive material and the lug is less than or about the same as the resistance along the active area.

Typically the conductive fibre material is a non-metallic conductive material such as a carbon fibre material, such as a non-woven such as felted carbon fibre material, or a knitted or a woven carbon fibre material. The material has an average interfibre spacing less than about 100 microns and in some embodiments less than about 50 microns, less than about 20 microns, or less than about 10 microns.

In some embodiments the impregnating material impregnates between at least about 30%, at least about 40%, at least about 50%, at least about 70%, at least about 80%, or at least about 95%, or at least about 98%, or at least about 99% of the fibres.

In some embodiments the interfibre voidage in the fibre material (being the fraction of the total volume defined by the material outside dimensions not occupied by the fibres— in the unimpregnated material) is reduced by at least about 50%, at least about 70%, at least about 80%, or at least about 95%, or at least about 98%, or at least about 99%.

In some embodiments the fibres of the conductive fibre material are multifilament fibres and the impregnating lug material also penetrates between filaments also reducing intrafibre voidage. In some embodiments intrafibre voidage is also reduced to about 40%, to about 30%, to about 25%, to about 20%, or to about 10%, to about 5%, to about 1% of the intrafibre voidage in the unimpregnated fibre material.

In broad terms in another aspect the invention comprises an electrode of a lead acid battery or cell or a lead-acid battery or cell comprising at least one electrode, comprising an electrically conductive material comprising a matrix of electrically conductive material extending between an active area of said electrode and a lug zone as a connector to the electrode, in which in the lug zone part of the conductive material lug material surrounds and/or penetrates and electrically connects to the conductive material so that the lug zone has voidage (being the fractional volume occupied by the pores between the lead and conductive fibres) of less than about 30% (over at least a major fraction of the electrode).

In broad terms in a further aspect the invention comprises a lead acid battery or cell including at least one electrode comprising as a current collector a conductive fibre material, comprising an electrically conductive lug material in a lug zone part of the fibre material surrounding and/or penetrating the fibres and forming an electrical connection to the fibre material in said lug zone and providing a lug for external connection of the electrode element, and comprising an active material in at least a part of the conductive fibre material other than in said lug zone, and wherein a surface to volume ratio of Pb particles in the active material is at least about 3 times greater than a surface to volume ratio of lug material in the lug zone.

Preferably the surface to volume ratio of Pb particles in the active material is at least about 5 times greater, or at least about 10 times greater, at least about 20 times greater, than a surface to volume ratio of lug material in the lug zone.

Preferably the surface to volume ratio of Pb particles in the active material is greater than about 2 $m^2/cm^3$ and the surface to volume ratio of lug material in the lug zone is less than about 0.5 $m^2/cm^3$, or the surface to volume ratio of Pb particles in the active material is greater than about 1 $m^2/cm^3$ and the surface to volume ratio of lug material in the lug zone is less than about 0.5 $m^2/cm^3$.

In at least some embodiments of a cell or battery employing an electrode of the invention a low surface to volume ratio of lug material in the lug zone may be desirable in order to keep the lug material, such as for example Pb, from being substantially reacted, for example to PbSO4, during discharge.

In broad terms in a further aspect the invention comprises a lead acid battery or cell including at least one electrode comprising as a current collector a conductive fibre material, comprising an electrically conductive lug material in a lug zone part of the fibre material surrounding and/or penetrating the fibres and forming an electrical connection to the fibre material in said lug zone and providing a lug for external connection of the electrode element, and comprising an active material in at least a part of the conductive fibre material other than in said lug zone, and wherein the active material contacts the lug where the fibre enters the lug and electrically connects direct to the lug.

Preferably the active material contacts the lug where the fibre enters the lug and electrically connects direct to the lug through a thickness of the fibre material, and preferably also along a major part of or substantially all the length of a boundary between the lug material and the non-lug material impregnated fibre material at this boundary.

Pressure Impregnation Lug Forming

In broad terms in another aspect the invention comprises a method for forming an electrical connection to an electrically conductive fibre material electrode element having an average interfibre spacing less than about 250 microns, which comprises pressure impregnating into a lug zone part of the fibre material, an electrically conductive lug material to surround and/or penetrate the fibres and form an electrical connection to the fibre material in said lug zone.

In broad terms in another aspect the invention comprises an electrically conductive fibre material electrode element having an average interfibre spacing less than about 100 microns, which comprises an electrically conductive lug material pressure impregnated into a lug zone part of the fibre material and surrounding and/or penetrating the fibres and forming an electrical connection to the fibre material in said lug zone.

At least some embodiments comprise heating the lug material and pressure impregnating it when molten into the fibre material. At least some embodiments comprise surrounding or enclosing the lug zone part of the fibre material in a die, pressure impregnating the molten lug material into the fibre material in the lug zone in the die, and allowing the lug material to cool and solidify around the fibres. In at least some embodiments pressure impregnating the molten lug material into the fibre material includes pressure impregnating the molten lug material into the die. In other embodiments the lug material may a thermoplastic or thermoset or reaction set conductive polymer that is then pressure impregnated into the fibre material. The die may comprise die parts which are brought together with the fibre material between, and a closing pressure or force of the die parts against the fibre material is less than a pressure impregnating the molten lug material into the die. In other embodiments pressure impregnating the molten lug material into the fibre material includes closing a die on the lug material and fibre material in the die so that the die closing force pressure impregnates the molten lug material into the fibre material. In other embodiment on closing the die parts hold the fibre material in place to assist and/or enable the molten lug material to pressure impregnate the fibre material.

In at least some embodiments the die comprises a boundary or periphery part which is more thermally conductive (alternatively referred to as thermally dissipative) than a non-boundary or periphery part of the die. In other embodiments the die comprises a boundary or periphery part which is cooler than a non-boundary or periphery part of the die. The impregnating material flows towards the higher thermally conductive or cooler boundary part of the die. At this boundary part, the impregnating material, including impregnating material which has flowed/impregnated into the fibres, cools and solidifies ('freezes'), to reduce or prevent flow of further molten impregnating material beyond this (frozen) boundary part. Because the solidified lug boundary part helps reduce the further flow of molten lug material, less clamping pressure may be required to contain the molten material in the lug zone of the fibre material. The boundary or periphery part may be all or part of the whole boundary or periphery of the lug zone. The die may comprise two die parts which are brought together with the fibre material between them and thus the closing pressure or force applied to the area between the die parts and thus against the fibre material may be less than an injection pressure of the impregnating material into the die cavity or the fibre material because in this embodiment the impregnated material is contained by a combination of closing pressure of the die parts and such boundary solidification. The closing pressure on the fibre material between the die parts may thus be at a level which does not damage or significantly damage for example structurally damage the fibre material, by crushing. In some embodiments the die closing force against the fibre material may result in a pressure against the fibre material of less than about 240 or about 120 Bar for example for woven or knitted materials such as carbon woven materials, or less than about 40 or about 20 Bar when the fibre material is a non-woven such as for a felt or carbon felt material for example. In other embodiments die parts may not actually contact the fibre material, so that there is no pressure (from the die) on the fibre material during lug impregnation.

In some embodiments a die part on at least one side comprises an area such as a centre area which has lower thermal conductivity than the more thermally conductive (or dissipative) or cooler boundary or periphery part. In some embodiments a die part on at least one side comprises an area such as a centre area which has a higher temperature, for example is heated, than the more thermally conductive or cooler boundary part. In some embodiments such a centre area of the die part is mounted on a piston or similar, which is arranged to move to apply force to the molten lug material after injection and whilst cooling, to increase penetration of the lug material into the fibre material. The piston arrangement may also eject the electrode from the die after solidification of the lug.

In some embodiments a die system is arranged to cause the molten lug material to enter the fibre material along an edge of the fibre material. The die (at least when closed) may define a transverse injection gap through which the molten lug material enters the fibre material through said edge of the carbon fibre material. The transverse injection gap may be defined between two opposite die parts when closed together. In some embodiments the die is open along a transverse opening opposite or above the transverse injection gap in the direction of molten lug material movement, and the fibre material beyond the lug zone extends through said transverse opening during impregnation. Impregnating the fibre material may be for a predetermined time and/or predetermined volume of lug material, and then the injection pressure is terminated and the lug material in the die allowed to cool and solidify. In some embodiments a dimension across the die cavity through a major plane of the carbon fibre material in use is less than a transverse dimension of the die in the plane of the carbon fibre material, such as approximately the same as the thickness of the fibre material to form a thin lug of approximately the same thickness as the fibre material.

In some embodiments the die is also arranged to form a lug extension (of solid lug material) beyond an edge of the fibre material.

In some embodiments remaining voidage if any between the lug and the fibre material is reduced by impregnating after forming the lug, a filler which is substantially inert to an electrolyte, or is separated from bulk electrolyte by a barrier of a material substantially inert to the electrolyte. In other embodiments the lug material is substantially inert to an electrolyte eg titanium.

Conductive Filler Lug Forming

In board terms in another aspect the invention comprises a method of forming a conductive lug to conductive fibre electrical connection comprising applying a conductive paste, an encapsulating material, or an adhesive to a lug zone of the fibre material and forming a conductive region electrically connected to the fibre material.

In broad terms in another aspect the invention comprises a conductive lug to conductive fibre connection formed by applying a conductive paste, an encapsulating material or an adhesive to a lug zone of fibre material and causing electrical connection to and/or into said fibre material with, if required, either heat and/or pressure, to form a conductive fibre connection in said lug region with reduced voidage relative to the bulk fibre material.

Electrochemical Lug Forming

In broad terms in another aspect the invention comprises a method for forming a conductive lug to conductive fibre electrical connection comprising:

applying to the conductive fibre material a paste which comprises a mixture of lead-based particles, applying to at least part of a thus pasted part of the conductive fibre material a metal element, and passing an electric current through the metal element and through the paste beneath and through the conductive fibre material beneath at a suitable potential with respect to the acid electrolyte to form a metal penetration into the conductive fibre material and connection between the conductive fibre material and the metal element.

In broad terms in another aspect the invention comprises a conductive lug to conductive fibre electrical connection formed by applying a paste which comprises a mixture of lead-based particles to the conductive fibre material, applying to at least a part of a thus pasted part of the conductive fibre material the metal element, and passing an electric current through the metal element and through the paste beneath it and gradually to at least said part of the conductive fibre material at a suitable potential with respect to the acid electrolyte to form a metal penetration into the conductive fibre material and connection between the conductive fibre material and the metal element.

In some embodiments the paste comprises Pb-sulphate particles, PbO particles, Pb particles, or a mixture of Pb-sulphate particles, and/or PbO particles, and/or Pb particles, or a mixture of zinc and zinc oxide particles, or Cd or $Cd(OH)_2$ particles. Circuit connections for the electro chemical paste conversion, may be made to the metal element and a part of the fibre material for example one edge of the fibre material, or to the metal element and two or more parts of the fibre material for example two edges such as two opposite edges of the fibre material. During the step of passing an electric current through the metal element or connector and at least said part of the conductive fibre material to connect the conductive fibre material and the connector, the Pb-based particles in the paste convert to lead first just beneath the connector and gradually intimately between the fibres beneath the connector and thus to connect or electrically connect the fibres and the metal element or connector.

General

In all embodiments above the conductive fibre material may be a non-woven material such as a felt material, a woven material (comprising intersecting warp and weft fibres), or a knitted material. The material may be a carbon fibre material, such as a non-woven, knitted, or woven carbon fibre fabric, or alternatively a glass fibre or silicon based fibrous material. The fibres, for example, carbon fibres are typically multifilamentary but may be monofilament. In some embodiments the fibre material has an average inter-fibre spacing of less than about 250 microns, or less than about 100 microns, less than about 50 microns, less than about 20 microns, or less than about 10 microns. The fibre diameter may be in the range from about 1 micron to about 30 microns, from about 4 microns to about 20 micron, from about 5 microns to about 15 microns. The voidage in the (unimpregnated) material may be at least about 80% or at least about 95% for example, to about 2% for example.

In some embodiments the impregnating lug material is a metal. In one embodiment the metal is Pb or a Pb alloy (herein both referred to inclusively as Pb). In another embodiment the metal is a Zn or a Zn alloy (herein both referred to inclusively as Zn). In another embodiment the metal is Cd or a Cd alloy (herein both referred to inclusively as Cd). Alternatively the impregnating lug material may be a conductive polymer for example.

In some embodiments the conductive fibre material may be carbon fibre material which has been treated by electric arc discharge. The carbon fibre material may be electric arc treated by moving the carbon fibre material within a reaction chamber either through an electric arc in a gap between electrodes including multiple adjacent electrodes on one side of the material, or past multiple adjacent electrodes so that an electric arc exists between each of the electrodes and the material. In other embodiments the carbon fibre material for use as the electrode current collector material may be thermally treated at an elevated temperature for example in the range 1200 to 2800° C. Such treatment may increase electrical conductivity of the material.

In some embodiments the conductive fibre material has been woven, or knitted, from multifilament carbon fibre which has been:

split from a higher filament count bundle of carbon fibres ('tow'), into smaller tows, or stretch broken to break individual continuous filaments into shorter filaments and separate lengthwise the ends of filaments at each break, reducing the filament count of the carbon fibre tow, or split from a higher filament count bundle of carbon fibres ('tow'), into smaller tows, and then stretch broken to break individual continuous filaments into shorter filaments and separate lengthwise the ends of filaments eat each break, further reducing the filament count of the carbon fibre tows.

In a cell or battery, the positive electrode or electrodes, the negative electrode or electrodes, or both, may be formed of one or more layers of the conductive fibre material with a lug, in accordance with the invention. The invention has been described herein sometimes with reference to electrodes of Pb-acid batteries but may also have application to other battery types such as Li-ion batteries, and in other applications such as in electrodes in solar cells, or in capacitors or supercapacitors, for example.

In some embodiments the invention comprises a hybrid automotive vehicle comprising a lead acid battery of the present invention and/or made in accordance with the methods taught herein. In other embodiments the hybrid automotive vehicle has stop-start and/or regenerative braking functionality. In other embodiments the battery can carry accessory loads when the vehicle engine is off.

In this specification 'lug' means any electrically conductive element or connector which enables external connection of the conductive fibre electrode, regardless of physical or mechanical form.

In this specification 'lug region' and 'lug zone' are used interchangeably and have the same meaning.

In this specification "matrix" in relation to the lug refers to lug material encapsulating the conductive fibre material in the lug zone in a 3-dimensional structure that has length, width and depth.

In this specification "hybrid vehicle" refers to a vehicle that incorporates any one of idle elimination (stop-start functionality), regenerative braking, and any combination of an internal combustion engine with an electric motor where one or the other or both can provide a drive functionality, a hybrid vehicle may also include a vehicle that may only be a partial hybrid vehicle.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

BRIEF DESCRIPTION OF THE FIGURES

Embodiments of the invention are further described with reference to the accompanying figures by way of example wherein.

DETAILED DESCRIPTION OF PREFERRED EMBODIMENTS

Pressure Impregnated Lugs

Figure 1:
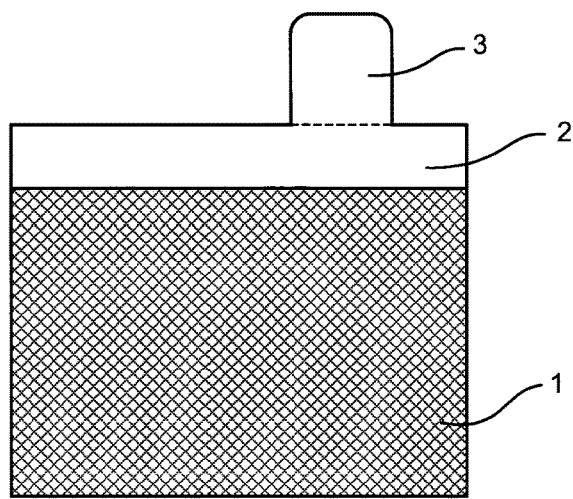
FIG. 1 shows part of a carbon fibre material electrode with a Pb lug formed by a first pressure impregnating embodiment of the invention.
Figure 2:
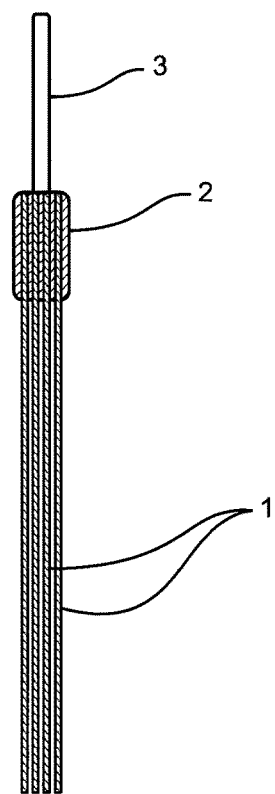
FIG. 2 is schematic cross-section of an electrode comprising multiple layers of carbon fibre material and a lug, FIGS. 3-1 to 3-7 schematically show a series of steps for forming a lug on an electrode of fibre material according to the first pressure impregnating embodiment of the invention.

FIG. 1 shows a section of a conductive fibre electrode such as of carbon fibre, for a Pb-acid cell or battery for example, with one form of lug such as a Pb lug, formed on the fibre material by a first pressure impregnating embodiment of the invention. The fibre material is indicated at 1 and the lug at 2. The lug may have a similar thickness (dimension through the plane of the material) to the fibre material thickness or a greater thickness. FIG. 2 is a schematic cross-section of a similar electrode comprising multiple layers 1 of fibre material, and a lug 2. In both embodiments the lug has a lug extension 3 beyond the edge of the fibre material, comprising lug material only ie solid lug material such as Pb.

Figure 9:
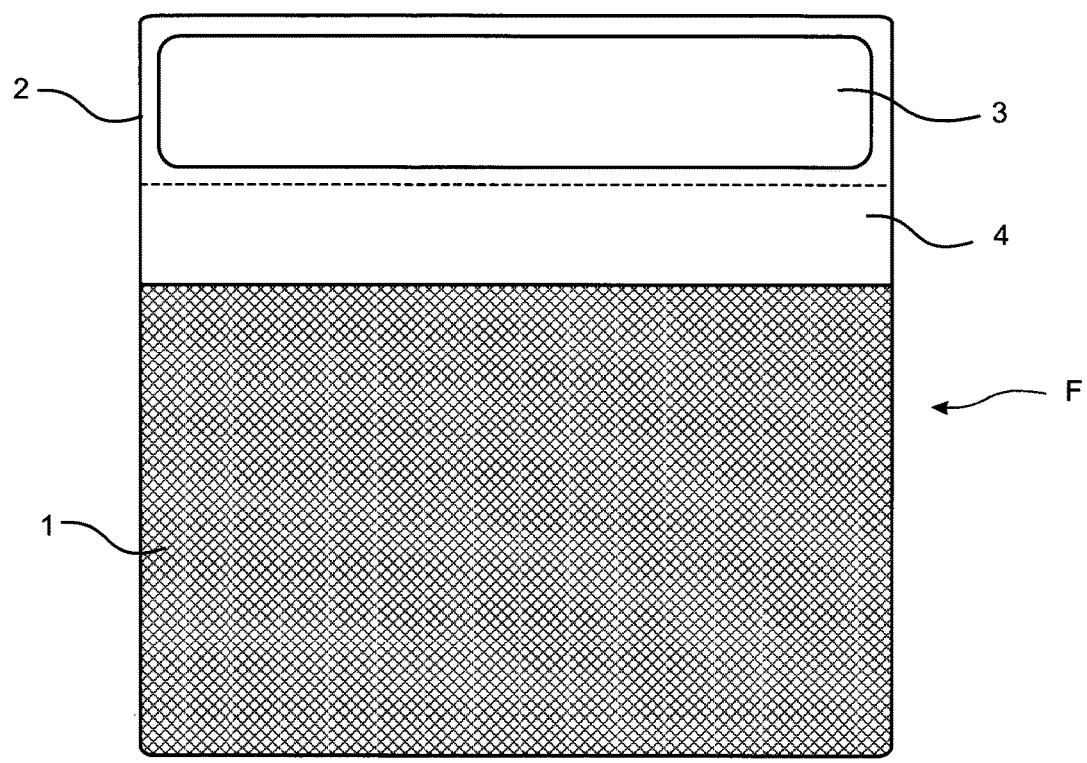
FIG. 9 shows a carbon fibre material electrode with another form of Pb lug formed by a second pressure impregnating embodiment of the invention.
Figure 10:
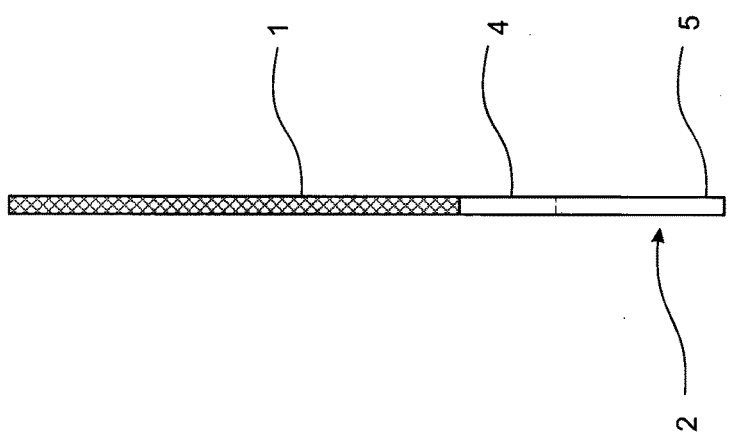
FIG. 10 is a view of the carbon fibre electrode of FIG. 9 in the direction of arrow F thereof.
Figure 12:
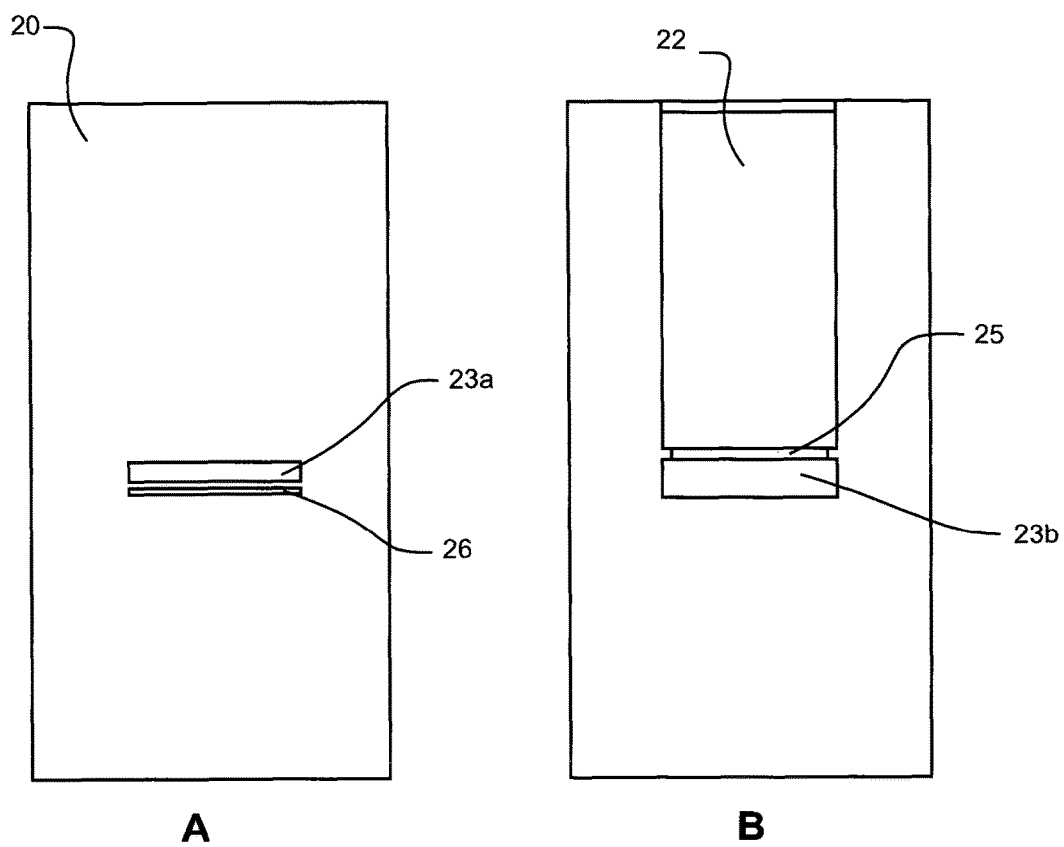
Figure 13:
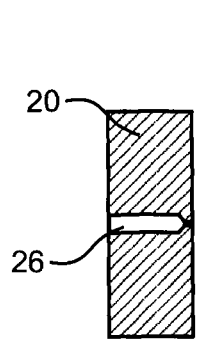
FIG. 13 is a schematic cross-section view along line of FIG. 11 but of one die part only (left hand part in FIG. 14)
Figure 14:
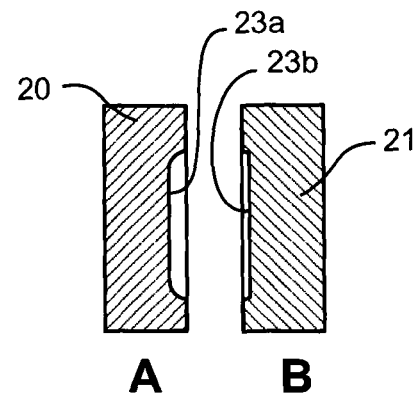
FIG. 14 is a schematic cross-section view along line IV-IV of FIG. 11 (both die parts), FIGS. 15-1 to 15-6 schematically show a series of steps for forming a lug on an electrode of fibre material according to the second pressure impregnating embodiment of the invention.

FIGS. 9 and 10 show a conductive fibre electrode such as of carbon fibre, for a Pb-acid cell or battery for example, with another form of lug such as a Pb lug, formed on the fibre material by a second pressure impregnating embodiment of the invention. The fibre material is again indicated at 1 and the lug at 2. The lug 2 comprises a portion 4 (the lug zone of the electrode) in which the fibre material is impregnated by the lug material, and a lug extension 3 beyond the edge of the fibre material, comprising lug material only. In the embodiment shown the lug has a similar thickness (dimension through the plane of the material) to the fibre material thickness and the lug may be not thicker than the carbon fibre material.

The lug is typically formed of metal such as Pb or a Pb alloy, Zn or a Zn alloy, or Cd or a Cd alloy, but may alternatively be formed of other lug material such as a conductive polymer for example.

In the embodiment shown the lug extends along a single edge of the electrode, which is a single upper edge, but alternatively the lug may extend along two or more edges of the electrode, the lug may be curved or arcuate in shape, and/or may be formed to extend across a centre area of an electrode.

In some embodiments substantially all or at least a majority of the fibres of the electrode material extend continuously across the electrode to or through the lug.

The fibre material may be a non-woven such as felt, knitted, or woven fibre fabric, in particular a non-woven such as felt, knitted, or woven carbon fibre fabric. Alternatively the material may be a glass fibre or silicon based fibrous material, which may be coated with a conductive material typically metal, such as a Pb film or coating. The fibres, for example carbon fibres, are typically multifilamentary but may be monofilament. In at least some embodiments the fibre material has an average interfibre spacing of less than about 250 microns, less than about 100 microns, less than about 50 microns, less than about 20 microns, or less than about 10 microns. In at least some embodiments the fibre diameter is in the range from about 1 micron to about 30 microns, from about 4 microns to about 20 micron, or from about 5 microns to about 15 microns. The voidage in the (unimpregnated) material may be in the range of from about 50% to at least about 1%, from about 40% to about 1%, or from about 30% to about 1%.

In some embodiments the impregnating material impregnates between at least about 50%, at least about 70%, at least about 80%, or at least about 95% of the fibres.

In some embodiments the interfibre voidage in the fibre material (being the fraction of the total volume defined by the material outside dimensions not occupied by the fibres—in the unimpregnated material) is reduced by impregnation of the lug material between into the interfibre voidage between the fibres, at least about 50%, at least about 70%, at least about 80%, at least about 95%, at least about 98%, or at least about 99%.

In some embodiments the fibres of the fibre material are multifilament fibres and the impregnating lug material also penetrates between filaments also reducing intrafibre voidage. In some embodiments intrafibre voidage is also reduced to about 40%, to about 30%, to about 25%, to about 20%, to about 10%, to about 5%, or to about 1% of the intrafibre voidage in the unimpregnated fibre material.

A matrix of the lug material encapsulates the microscale carbon fibre electrode material in the lug zone. A very low electrical resistance connection is formed between the microscale carbon fibre electrode material and lug. Also voidage between the lug material and the fibres is minimised, preventing or minimising battery electrolyte from subsequently entering the lug to fibre connection and deteriorating the connection, so the connection is more durable.

Optionally any remaining (open cell/porous) voidage between the lug material and the fibres and/or filaments may be reduced by filling with a material which is substantially inert to the electrolyte, such as for example a non-conductive polymer such as an epoxy.

Optionally the impregnating material (not inert to an electrolyte) is protected from the bulk of the electrolyte by an inert material barrier.

Optionally also the impregnating lug material may be a material which is electrically conductive but substantially inert to a battery electrolyte such as a Pb acid battery electrolyte such as titanium.

The conductive or carbon fibre material may have a thickness (transverse to a length and width or in plane dimensions of the electrode) many times such as about 10, 20, 50, or 100 times less than the or any in plane dimension of the electrode. The thickness may be less than about 5 or less than about 3 mm or less than about 2 mm or about or less than about 1 mm or about 0.2 mm for example. Each of the in plane length and width dimensions of the electrode may be greater than about 50 or about 100 mm for example. Such electrodes have a planar form with low thickness. In preferred forms the electrode is substantially planar and has a dimension from a metal lug for external connection along at least one edge of the electrode less than about 100 mm or less than about 70 mm, or less than about 50 mm, or about 30 mm or less for example (with or without a macro-scale current collector). Alternatively such a planar form may be formed into a cylindrical electrode for example.

Pressure Impregnation Lug Forming

Figure 3:
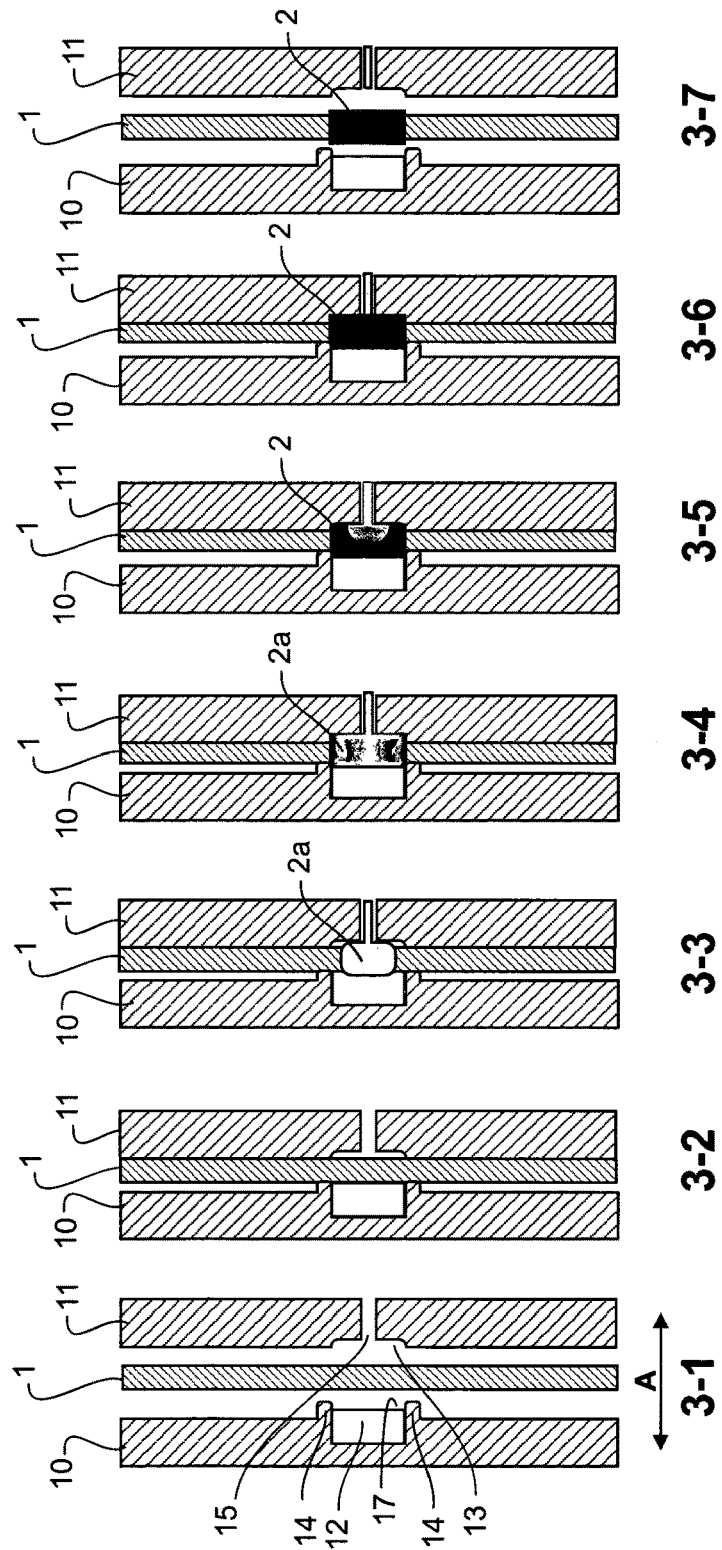
Figure 4:
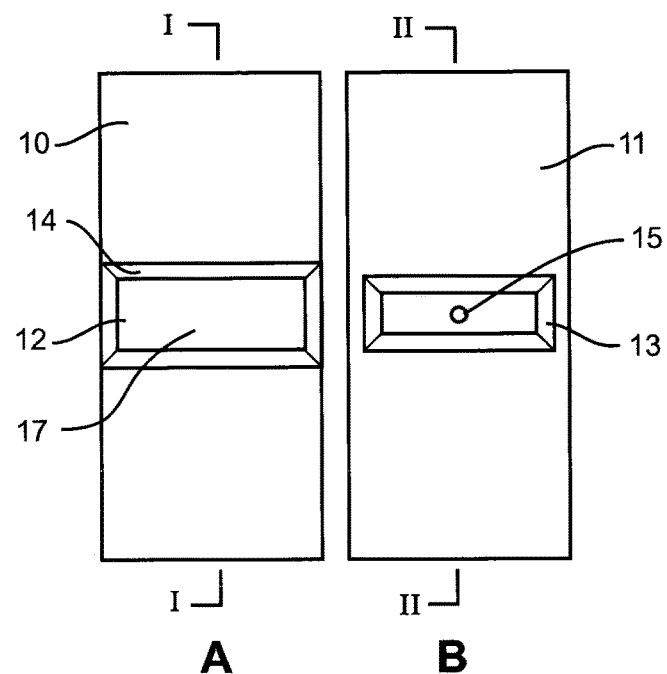
FIGS. 4A and 4B are schematic views of the inside faces of two opposite die parts of one embodiment of a die.

FIGS. 3-1 to 3-7 schematically show a series of steps for pressure impregnating a microscale fibre material to form a lug of the form of FIGS. 1 and 2, FIG. 4A is a schematic view of the inside face of the die part shown on the left in FIGS. 3-1 to 3-7, and FIG. 4B is a schematic view of the inside face of the die part shown on the right in FIGS. 3-1 to 3-7. The lug is formed by pressure impregnating lug metal into a lug zone part of the fibre material to penetrate into and form an electrical connection to the fibre material in the lug zone. Referring to FIGS. 3-1 and 4A and 4B, in the embodiment shown the die comprises two die parts 10 and 11 with internal cavities 12 and 13. The die parts 10 and 11 close together and open reciprocally in operation in the direction of arrow A. (see FIG. 3A). The die parts are brought together with the fibre material, indicated at 1 in FIG. 3, between and extending through the die cavity as shown. FIG. 3-1 shows the die open ie the two die parts separated, and FIG. 3-2 shows the two die parts closed against the fibre material but before lug metal injection. One (or both) of the die parts may comprise a peripheral protrusion or wall 14 (boundary or periphery part of the die) around the cavity which when the die parts close together contacts the carbon fibre around a periphery or boundary part of the lug zone of the fibre material. However the closing pressure or force between the die parts and thus against the fibre may be at a level which does not damage or significantly damage for example structurally damage the fibre material, by crushing. The closing pressure may be less than the injection pressure of the molten metal into the die cavity. In some embodiments the pressure against the fibre material may be (only) about 5 Bar, for example for woven carbon fibre materials, or up to only 5 Bar non-woven carbon fibre material such as felt material for example. In one embodiment the die parts may not touch the fibre material but may when the die is closed be closely spaced for example less than 0.5 mm or less than 0.25 mm from the surface of the fibre material. Such a gap may allow the lug material to flow around the outside surfaces of the fibre material, but should be sufficiently small that this lug material will quickly cool and solidify (freeze) so that further injected lug material is then pressure impregnated into the fibre material. Alternatively the die parts may contact the fibre material when closed but with no pressure/compression of the fibre material.

Referring to FIG. 3-3 lug metal 2a is heated and impregnated into the die cavity through one or more ports and preferably a port such as indicated at 15 which delivers molten lug metal into a central area of the cavity as shown. The impregnating pressure causes the molten metal to penetrate between the microscale fibres in the lug zone, and is maintained at a level so that molten metal will pass from the injection side 11 of the die cavity, and between the fibres in the lug zone, to fill the cavity between the two sides of the die cavity, so that a lug with metal on both sides of the fibre material is formed and with metal penetrating between the fibres ie at least partially filling the interfibre voidage, and preferably also penetrating into the fibres if the fibres are multifilamentary fibres ie filling at least partially the intrafibre voidage. Alternatively metal may be impregnated from both sides or from an edge of the die cavity.

When the penetrating metal reaches the boundary part 14 of the die cavity or lug zone of the fibre material, the penetrating molten metal at or adjacent and around the boundary part 14 cools and solidifies ie freezes. This cooled and solidified boundary metal of the forming lug prevents further penetration of molten lug metal into the fibre material beyond boundary part 14, and therefore the clamping pressure between the two die parts may be less than the injection pressure of the impregnating material or metal. The metal in the die cavity ie the formed lug 2, is then allowed to cool and solidify as shown in FIGS. 3-5 and 3-6 to form a complete (solid) lug as shown in FIGS. 3-6, and the die is then opened as shown in FIG. 3-7 to release or eject the fibre material with a solidified metal lug thereon.

In some embodiments cooling and solidification first of the lug periphery is achieved by the boundary or periphery part of the die, such as the protrusion or wall 14, being more thermally conductive (or thermally dissipative) than a central area of the die cavity. In other embodiments the boundary part is held at or cooled to a lower temperature than a central area of the die cavity by ducts in the die parts through which a cooling fluid is circulated for example.

Figure 5:
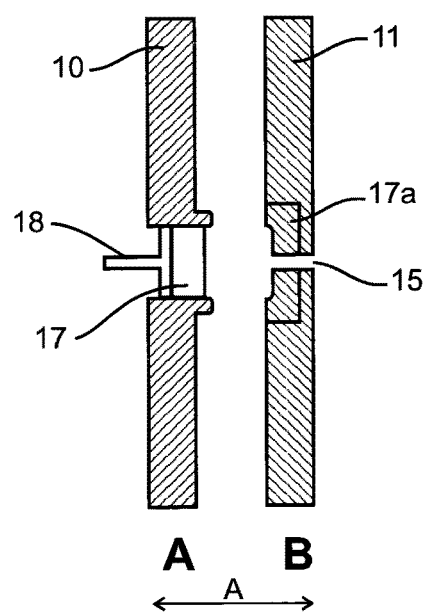
FIGS. 5A and 5B are schematic cross-section views along line I-I of FIG. 4A and line II-II of FIG. 4B respectively of the back and front plates of another embodiment of a die.

In the embodiment shown in FIGS. 3-1 to 3-7, the die part 10 has a cavity 12 opposite the injection port 15 which is held at or cooled to a lower temperature lower than the melting temperature of the lug material injected. The die part 10 also is provided with a thermal insulating insert 17. The temperature of the other die part 11 with injecting port 15 is held closer to the melting point of the lug metal to prevent the injected molten metal solidifying prematurely. Referring to FIG. 3-5, when molten metal first flows into and begins filling the die cavity, in the centre of the die cavity it contacts the insulating thermal insert 17 which prevents the molten metal from cooling and solidifying too quickly in the centre of the die cavity. Thus the molten metal in the centre of the die cavity continues to flow under the injection pressure, outwardly toward the periphery of the die cavity, to fill the entire die cavity and to penetrate the carbon fibre in the die cavity (and freezes first at the boundary as described above). Alternatively instead of providing the insulating 17 the central area of the die cavity may be heated during the metal injection relative to the boundary 14 of the die cavity.

FIG. 5A is a schematic side cross-section view of die back plate part 10 along line I-I of FIG. 4A showing thermal insulating material 17 in the centre of the die cavity mounted on a piston 18. This piston can move in the direction of arrow A to compress the molten impregnated material into the fibre material prior to freezing, to further reduce voidage, and can also operate to eject the formed lug once the die plates have opened.

FIG. 5B is a schematic side cross-section view of die front plate part 11 along line II-II of FIG. 4B. In this embodiment thermal insulating material 17a is provided in the centre of the injection part side of the die and around injection port 15.

Figure 15:
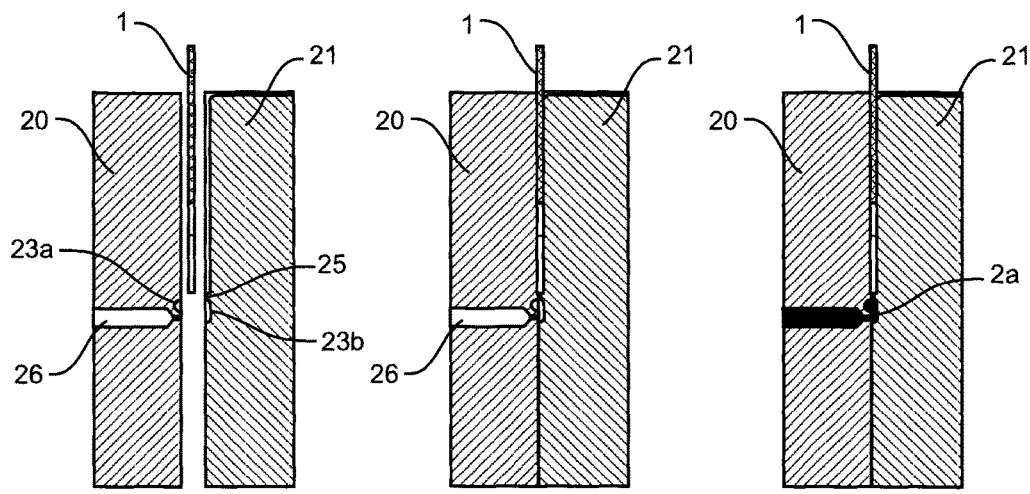
Figure 15:
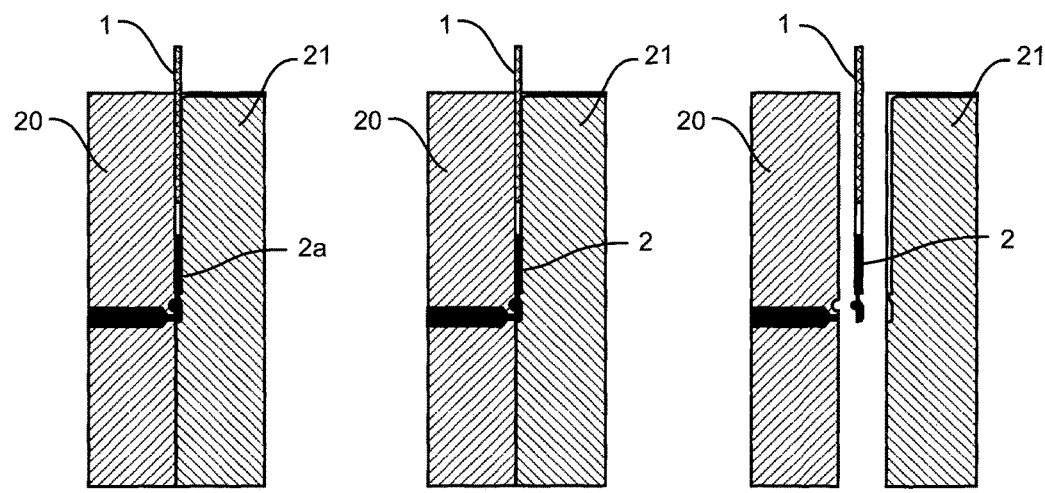

FIGS. 11 to 15 schematically show pressure impregnating by a second embodiment to form a lug of the form of FIGS. 9 and 10. FIGS. 11 to 14 are schematic cross-section views of a die system, and FIGS. 15-1 to 15-6 schematically show a series of steps for forming a lug.

Again the lug is formed by pressure impregnating into a lug zone part of fibre material to form a conductive penetration into and connection to the fibre material in the lug zone. The die comprises two die parts 20 and 21 which close together and open reciprocally in operation in the direction of arrow B. The die comprises internal cavity 22. The die (when closed) comprises a transverse flow conduit 23 below the cavity 22 (below in the direction of molten material movement C—as will be further described). The transverse flow conduit 23 is made up of transverse cavities 23a and 23b in the opposite die parts. Both die cavity 22 and flow conduit 23 below extend transversely across the die (see FIGS. 12 and 14) and they are separated by a transverse projection 25 in one die part 21 part way across the die cavity 22. When the die parts 20 and 21 are brought together the top of the die cavity is open at 24.

Figure 11:
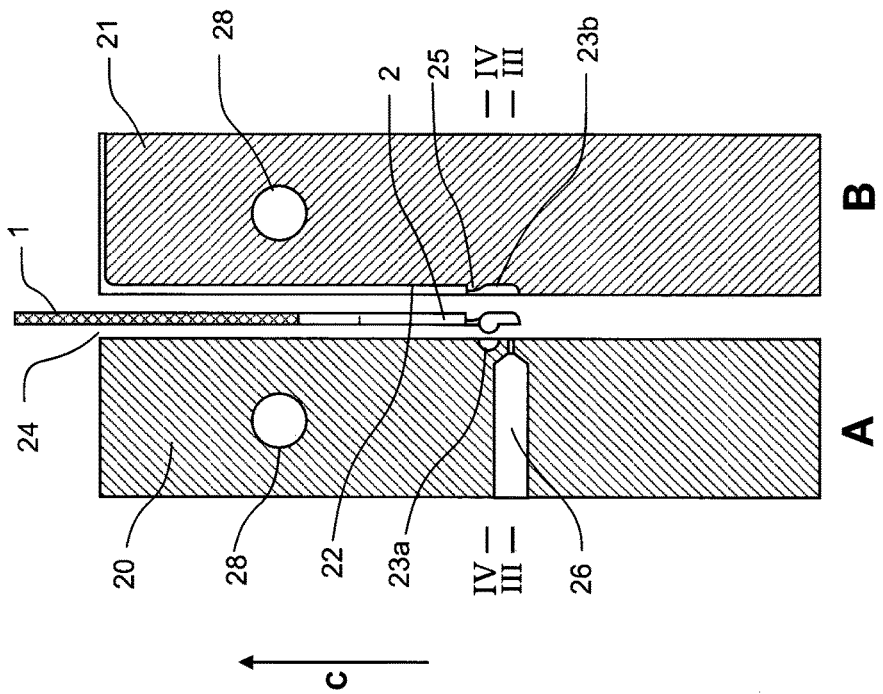
FIG. 11 is an expanded schematic cross-section view of a die to form a lug of the form of FIGS. 9 and 10, FIGS. 12A and 12B are schematic views of the inside faces of two opposite die parts of the die of FIG. 11.

In operation the die parts 20 and 21 are brought together with an edge of fibre material 1 on which a lug is to be formed in the die cavity as shown in FIG. 11 (though FIG. 11 shows the die open). The balance of the fibre material 1 extends from the open transverse slot 24. Lug metal 2a is heated and impregnated into the die cavity through injection port 26 which delivers molten metal into flow conduit 23 extending transversely across the die, which it fills. Molten metal then exits flow conduit 23 transversely across the die moving in the direction of arrow C in FIG. 11, and flows through a transverse injection gap past transverse protrusion 25 also extending across the die, and impregnating the fibre material 1 along and through its edge. The molten metal penetrates the fibre material in the lug zone. Cooling ducts 28 are provided in the die parts 20 and 21 through which cooling fluid is circulated to cool the die above the lug zone of the fibre material in use. The front of molten metal moving up the die cavity 22 and into the fibre material 1 cools and solidifies ie freezes, and the resulting transverse line of solid metal across the die prevents further penetration of the metal into the fibre material and defines the limit of the metal lug. After a predetermined time period the injection pressure is terminated and the Metal in the die cavities 23 and 22 allowed to cool and solidify, and the die is then opened to release or eject the carbon fibre material with a metal lug thereon.

FIG. 15-1 shows the die open ie the two die parts 20 and 21 separated, and FIG. 15-2 shows the two die parts closed against the fibre material 1 but before metal injection. FIG.

15-3 shows hot metal 2a entering the die cavity through port 26 and filling conduit 23 across the width of the die. FIG. 15-4 shows molten metal entering die cavity 27 and penetrating the carbon fibre. FIG. 15-5 shows the metal cooling to solidify the lug on the carbon fibre 1, and FIG. 15-6 shows the die opening to release the carbon fibre material with a metal lug thereon.

The dimension across the die cavity 27 between the two die parts 20 and 21 may be approximately the same as the thickness of the fibre material to form a thin lug of approximately the same thickness as the fibre material, as described previously or greater to form a thicker lug. Again, the closing pressure or force between the die parts and thus against the fibre may be at a level which does not damage or significantly damage for example structurally damage the fibre material, by crushing. In some embodiments the pressure against the fibre material may be (only) about 5 Bar, for example for woven carbon fibre materials, or up to only 5 Bar non-woven carbon fibre material such as felt material for example. In one embodiment the die parts may not touch the fibre material but may when the die is closed be closely spaced for example less than 0.5 mm or less than 0.25 mm from the surface of the fibre material. Such a gap may allow the lug material to flow around the outside surfaces of the fibre material, but should be sufficiently small that this lug material will quickly cool and solidify (freeze) so that further injected lug material is then pressure impregnated into the fibre material. Alternatively the die parts may contact the fibre material when closed but with no pressure/compression of the fibre material.

Figure 16:
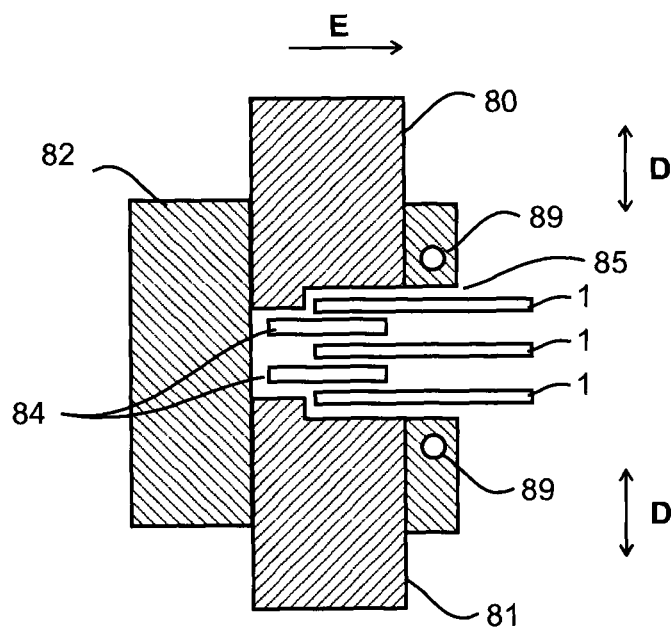
FIG. 16 is a schematic cross-section of a die to form a lug on an electrode of fibre material, according to a third pressure impregnating embodiment of the invention, FIG. 17 schematically illustrates steps of an embodiment for electrochemically forming a lug on a fibre material electrode.

FIG. 16 is a schematic cross-section of a die to form a lug on an electrode of fibre material, according to a third pressure impregnating embodiment of the invention. In this embodiment the pressure which impregnates the molten lug material into the fibre material is generated by closing a die on the lug material and fibre material in the die. Referring to FIG. 16, die parts 80 and 81 move reciprocally as indicated by arrows D on a machine bed 82 (the figure shows the die open). Duct(s) 89 which carry cooling fluid are provided along a distal part of each die part 80 and 81. Alternatively the distal parts of the die parts 80 and 81 may be formed of a material which dissipates heat more quickly for example.

In operation the edge of fibre material 1 on which a lug is to be formed is positioned in the die cavity between the die parts 80 and 81 as shown. The balance of the fibre material extends from the open transverse slot 85. Lug metal is also pre-positioned in the die cavity. For example in the figure two strips 88 of lug material are shown interleaved between three fibre material layers 1. The die parts 80 and 81 are heated and are and brought together to close the die, heating the lug metal under pressure, which melts and penetrates the fibre material 1 in the lug zone. Molten lug metal moving through the fibre material in the direction of arrow E cools and solidifies ie freezes adjacent the duct(s) 89, and the resulting transverse line of solid metal in the fibre material across the slot die opening prevents further penetration of the metal into the carbon fibre material and defines the limit of the metal lug. After a predetermined time period the injection pressure is terminated and the metal in the die cavity allowed to cool and solidify, and the die is then opened to release or eject the carbon fibre material with a metal lug thereon.

In all embodiments above, to aid impregnation of the fibre material by the lug metal under pressure, vibration or energy may be applied to the molten lug metal via one or more die parts during impregnation, for example at an ultrasound frequency such as a frequency in the range about 15 to about 25 kHz.

Battery or Cell Construction

A lug formed on fibre material electrode as described above may also comprise on one or both sides of the fibre material a metal wire or tape electrically conductively attached to the electrode material and to the lug, to provide an additional macro-scale current collecting pathway from the carbon fibre to the metal lug, in addition to the micro-scale pathways through the carbon fibre material itself of the lug. The metal wire or tape may be attached to the fibre material for example by stitching or sewing with a thread that will not dissolve in battery electrolyte, or other inert Pb acid battery binding material that will hold the current collector in place, such as a resin, cement or potting mix. The metal wire or tape may be pressed into the fibre material during manufacture. Alternatively the wire or tape or similar may be soldered to or printed on the fibre material. The metal wire or tape(s) may be arranged in a sinuous shape on one or both sides of the fibre material, extending continuously between the lug at one edge of the electrode, at which edge the wire or tape is conductively connected to the lug by being embedded in the lug, and at or towards another spaced edge of the electrode. Alternatively the wire or tape may extend between metal lugs along opposite edges of the electrode or a frame around the electrode. Alternatively again separate lengths of the wire or tape may extend from the lug at one edge to or towards another edge of the electrode, or alternatively again the wire or tape macro-conductor as described may comprise a metal mesh attached on one or both sides of the fibre material. The ends of the wire or tape or mesh may terminate and be embedded in the lug. It is important that when the current collector is on the outer surface of the electrode that acts as the negative electrode the current collector is protected from anodic oxidation from the positive electrode. Preferably the wire or tape runs up and down the length of the electrode with equal spacing across the width of the electrode without any cross over points, to prevent local hotspots occurring or heat build up in particular areas, and an even current collection across the electrode. Preferably the volume of the wire or tape or mesh or similar macro-scale current collecting system is less than about 15% of the volume of the electrode (excluding the lug or surrounding metal frame or similar).

Typically during battery or cell construction the microscale current collector material is impregnated under pressure with a paste, which in a preferred form comprises a mixture of Pb and PbO particles of Pb and PbO and dilute sulfuric acid. Alternatively the paste may comprise lead sulphate (PbSO$_4$) particles and dilute sulphuric acid. In some embodiments the paste at impregnation into the electrode comprises dilute sulphuric acid comprising between greater than 0% and about 5%, or between 0.25% and about 3%, or between 0% and about 2%, or between 0.5 and 2.5% by weight of the paste of sulphuric acid. The Pb-based particles may comprise milled or chemically formed particles which may have a mean size of 10 microns or less, small enough to fit easily into spaces between the fibres. The paste or active material may fill the carbon fibre electrode up to the lug so that the active material contacts or abuts the lug where the fibre enters the lug and electrically connects direct to the lug, not only at the surface of the fibre material on either side but also through the thickness of the fibre material, and along a major part of or substantially all the length of the boundary between the lug material and the non-lug material impregnated fibre material at this boundary, or may stop short of the lug so that there is a small gap between the paste and the lug such as a gap of up to about 5 mm for example. In a preferred embodiment the lug is formed so as to have protrusions of the lug such as Pb protrusions, into the active material impregnated into the carbon fibre material, as described above.

As stated preferably the surface to volume ratio of Pb particles in the active material is at least about 3 times greater, or preferably about 5 times greater, or preferably about 10 times greater, or preferably about 20 times greater, than a surface to volume ratio of lug material in the lug zone. Preferably the surface to volume ratio of Pb particles in the active material is greater than about 2 $m^2/cm^3$ or greater than about 1 $m^2/cm^3$ and the surface to volume ratio of lug material in the lug zone is less than about 0.05 $m^2/cm^3$. The surface associated with molten lug material that has been injected into fibre layers, cooling as it enters, is likely to be similar to the surface area of the fibres that it will cool around, or less. For example, a carbon felt may have an area of the cylindrical surfaces of the fibres equal to around 20 $m^2$ per mm thickness for 1 $m^2$ of superficial area, which is equivalent to 0.02 $m^2$ per $cm^3$ of felt total volume. Thus flowing molten lead around this fibre network will form (by freezing onto the cold fibres first) a lead structure with branches larger in diameter than the diameter of the fibres ie. the diameter of the branches of this lead-loaded felt may increase from 10 microns to around 15 to 20 microns with surface area perhaps 0.01 $m^2$ per $cm^3$ (for higher volume fraction impregnation these branches will merge and the surface will decrease even further). These surface areas can be compared with those for the normal active material within a negative electrode in a lead-acid cell. Lead-containing active mass is divided into a lead skeleton that carries current (which is not susceptible to electrochemical change during charge and discharge cycles) and a much finer mass that is susceptible to change and in fact produces the working electrical currents of the battery. The much finer "energetic active material" may have around 0.3 micron diameter branches. The skeleton may be very similar to the branches formed by partial impregnation above, with negligible electrochemical attack. However the surface area of the fine electrochemically active material may have (20)/0.3)=70 times the surface area per unit volume of lead, and so suffers almost all the chemical attack. The division between fine material and coarse skeleton material is around 50/50% in most negative electrodes.

Electrochemical Lug Forming

Figure 17:
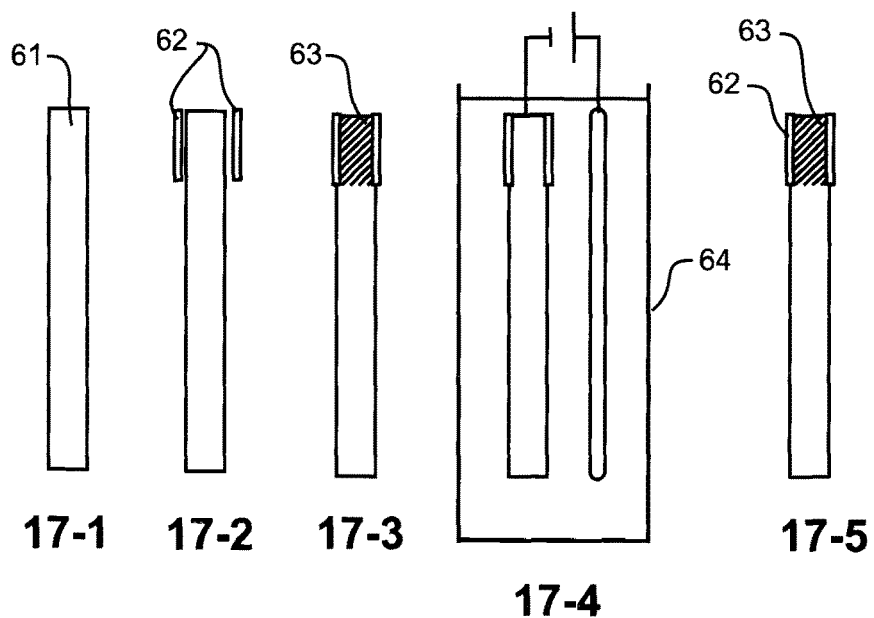

Referring to FIG. 17 in an embodiment of an electrochemical lug forming method of the invention as applied to a Pb-acid battery or cell electrode, a carbon or conductive fibre material element such as an electrode element has applied thereto a paste which comprises lead-based particles—in FIG. 17 the thus pasted element 61 is indicated at step 17-1. The paste may be impregnated into the fibre material under pressure and/or with vibration such as ultrasonic vibration to fully impregnate the paste between fibres. Optimally a curing process may then be undertaken, where for example the humidity and/or temperature is controlled.

The paste may comprise Pb-sulphate particles, PbO particles, Pb particles, or a mixture of Pb-sulphate particles, PbO particles, and/or Pb particles. In preferred embodiments this paste is substantially the sole source of lead in the active material paste. The particles may comprise milled or chemically formed particles and at least a major fraction of and preferably at least 80% of the particles may have an average size or diameter of 10 microns or less. The paste may optionally also contain other additives such as carbon black, barium sulphate and sulphonate.

The fibre surfaces of the material may be surface treated to enhance attachment of the Pb-based particles by processing to attach oxide particles or oxygen bearing chemical groups to the fibres. Anodic oxidation of electric arc-treated carbon fibre fabric also may convert it to a hydrophilic material. This may assist an even distribution of the active particles through the material and initial attraction of the Pb (covered with oxide groups) to the carbon, by dipole-dipole attractions.

As indicated at FIG. 17 step 17-2, a metal or conductive connector or connectors 62 comprising for example metal strips or in any other suitable form are mechanically attached to the pasted carbon fibre element 1 for example along at least one edge or alternatively extending across the carbon fibre element. Thus an area 63 of the pasted material is captured by the connectors 62. The strips may for example be crimped to the material edge or otherwise mechanically fixed to the material, with for example, compression, heating such as by induction or resistive heating, as indicated at step 17-3. Alternatively or additionally metal strip(s) may be provided between each of two or more layers of carbon fibre material forming the carbon fibre element 1. Alternatively again metal fibres may be incorporated in the edge of the carbon fibre element 1 for example by weaving into the carbon fibre material at or near the edge.

As indicated at step 17-4 the pasted carbon fibre element 1 with connector(s) 62 is dipped into dilute sulphuric acid in a cell 64, to cover the top of the connector, and connected as the negative electrode opposite another electrode polarised positively. An electric current is passed through the connector(s) 62 and the material 1 to electrically connect the fibres and the connector(s) by electrochemically converting the paste in area 63 into a Pb network. This forms Pb between the carbon fibres and overcomes the surface tension problems between Pb and carbon fibres in methods currently available. Alternatively in some embodiments the paste comprises dilute sulphuric acid, or is contacted with dilute sulphuric acid for example by spraying dilute sulphuric acid onto the carbon fibre element material instead of dipping. The electric current passing through the connector(s) and the carbon fibre element material and the dilute sulphuric acid-wetted paste between, causes the Pb-based particles in the paste to convert to lead first just beneath the connector and gradually intimately between the electrode material fibres in area 63, to connect or electrically connect the fibres there with the connector. Typically this step may be carried out at the start of initial electrode formation (first charge and discharge cycle during which active particle linkages form) before or after cell or battery construction. Thus the same conduction-forming process occurring in area 63 propagates to the remainder of the electrode. It may be advantageous that during formation the charging current is pulsed periodically.

In the embodiments described above the connector 62 is a metal strip such as a Pb strip mechanically attached to the carbon fibre element. In an alternative embodiment each of the connectors 62 is replaced by a mechanical fastening device for example a clamp having leady surfaces of the same desired geometry as the connector 62. These opposing fastening devices may then be removed after providing temporary contact with the area 63 during the formation process. The required acid electrolyte diffuses into area 63 along the fibre material from the edge or from the bulk of the electrode.

After the electrochemical conversion, the carbon fibre element at step 17-5 with resultant lug can then undergo a further process step to remove any porosity in area 63, to prevent or minimise or reduce electrolyte entering the pores in the Pb network in 63 (as subsequent discharge of the cell would then cause $PbSO_4$ to form, reducing or eliminating the conductive property of 63). Removal or reduction of porosity may be achieved by for example:

compression and/or heating area 63, for example, by induction or resistive heating, the region 63 is further dipped into a sealant solution that leaves the pores filled with a polymer that does not dissolve in the electrolyte, such a sealant solution includes for example a resin, and filling some of the remaining pores in 63 by electrode position of Pb from a strong solution of Pb ions.

Figure 18:
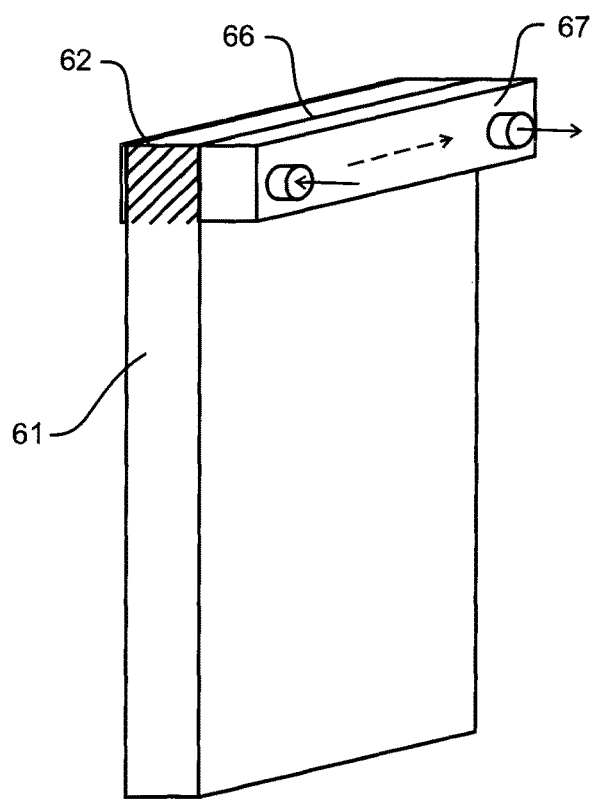
FIG. 18 is a perspective view of an electrode produced by the method of FIG. 17, FIGS. 19 and 20 are SEM images of lugs formed by the second pressure impregnating embodiment of the invention and as referred to further in the subsequent description of experimental work.

To explain the electro deposition of Pb, an alternative embodiment is illustrated in FIG. 18. One of the connectors 62 is replaced by a mechanical fastening device comprising an internal lengthwise conduit 67 and also supplied with sulphuric acid and also having leady surfaces 66 arranged to physically contact the carbon fibre element 1 on one side in the area 63 where paste material has already been applied and a connection is desired. The device may be fastened to an edge of the carbon fibre element or extend across the carbon fibre element so long as the desired pasted area 63 is captured by the leady surfaces 66 of the clamp. A suitable positive electrode is installed in the (recirculating) electrolyte flow entering and leaving 67 to complete a cell and current flow may generate Pb within the inter-fibre space within area 63, as carried out previously with a connector 62.

The leady surface 66 as shown in FIG. 18 may consist only of a leady perimeter (ie otherwise open) or may be a porous leady material, so that the electrolyte passing through the conduit 67 may permeate to the carbon fibre and paste.

After the above described formation process, a lead salt solution (for example of PbNO3) may then be passed through the conduit 67 in the connector 67 so that the lead pores that are in front of the conduit are filled with lead. A metered amount of solution may be injected into the conduit. The voltage applied between the positive and negative electrodes is then adjusted to achieve a suitable level so that lead is evenly deposited in the pores of the lug zone. The injection of the lead salt solution and the electrochemical deposition process is repeated until the pores are close to being filled with lead. Successive injections will be smaller and more difficult to achieve until no more injection or deposition can be achieved. Collapse procedures or resin injection may also be used at this point to remove any small accessible porosity remaining. This also may be carried out as an alternative to dipping step D above, but is more practical as a subsequent step.

In an embodiment for forming a carbon fibre electrode of a Ni—Cd battery or cell the lug may be formed of Cd and the paste comprise Cd such as CdOH particles.

General

In a battery typically a lead-acid battery, the positive electrode or electrodes, the negative electrode or electrodes, or both, may be formed with a lug in accordance with the method(s) of the invention. Preferably the current collector material and the fibres thereof are flexible, which will assist in accommodating volume changes of the active material attached to the current collector material during battery cycling, and the microscale fibres may also reinforce the active material, both assisting to reduce breaking off ("shedding") of active material from the electrode in use.

In preferred embodiments the electrode fibres are inherently conductive without requiring coating with a more conductive material such as a metal to increase conductivity, and may be carbon fibres which may in some embodiments be treated to increase conductivity. In other embodiments the electrode fibres may be a less conductive material, the fibres of which are coated with a conductive or more conductive coating. In some embodiments the fibres of the current collector material may be coated with Pb or a Pb-based material. For example the negative electrode or electrodes may be coated with Pb and the positive electrode(s) coated with Pb and then thereon $PbO_2$.

The current collector material may be a woven material, a knitted material, or a non-woven material, such as a felt. The material may comprise filaments extending in a major plane of the material with each filament composed of multiple fibres, with optionally connecting threads extending transversely across the filaments to mechanically connect the filaments. The average depth of the material may be at least 0.2 millimeters or at least 1 millimeter. At least a majority of the fibres have a mean fibre diameter of less than about 15 microns, more preferably less than or equal to about 6 to about 7 microns.

The fibre surfaces of the material may be surface treated to enhance attachment of the Pb-based particles by processing to attach oxide particles or oxygen bearing chemical groups to the fibres. Anodic oxidation of electric arc-treated carbon fibre fabric also may convert it to a hydrophilic material. This may assist an even distribution of the active particles through the material and initial attraction of the Pb (covered with oxide groups) to the carbon, by dipole-dipole attractions.

In some embodiments the conductive fibre material may be carbon fibre material which has been thermally treated at an elevated temperature, for example in the range 1000 to 4000° C. In some embodiments the conductive fibre material may be carbon fibre material which has been treated by electric arc discharge. The carbon fibre material may be electric arc treated by moving the carbon fibre material within a reaction chamber either through an electric arc in a gap between electrodes including multiple adjacent electrodes on one side of the material, or past multiple adjacent electrodes so that an electric arc exists between each of the electrodes and the material.

In some embodiments the conductive fibre material may be felt or other non-woven planar electrode material produced to very low thickness such as for example 2.5 mm or less thickness by dividing thicker material in plane. That is, the material may be cut in its plane one or more times to divide a thicker non-woven material into multiple sheets of similar length and width but reduces thickness to the starting sheet.

In some embodiments the conductive fibre material may be woven carbon fibre material may be woven from carbon fibre tows which have been 'stretch broken' ie a tow (bundle) of a larger number of continuous carbon fibre filaments is stretched after manufacture to break individual continuous filaments into shorter filaments and separate lengthwise the ends of filaments at each break, which has the effect of reducing the filament count of the carbon fibre tow. The resulting reduced filament count tow is twisted (like a rope) to maintain tow integrity. For example a tow of 50,000 continuous filaments may be stretch broken to produce a much longer tow composed of 600 shorter individual filaments which is then twisted, for example. In some embodiments the conductive fibre material may be carbon fibre material formed from carbon fibre tows which have been 'tow split' ie split from a higher filament count bundle of carbon fibres ('tow'), into smaller tows. In some embodiments the conductive fibre material may be carbon fibre material formed from carbon fibre tows both split from a higher filament count bundle of carbon fibres into smaller tows, and then stretch broken to break individual continuous filaments into shorter filaments and separate lengthwise the ends of filaments eat each break, further reducing the filament count of the carbon fibre tows.

EXPERIMENTAL

Example 1—Lug Formation

In experimental work Pb lugs were formed on carbon fibre material generally by the method described above with reference to FIG. 5.

Figure 6A:
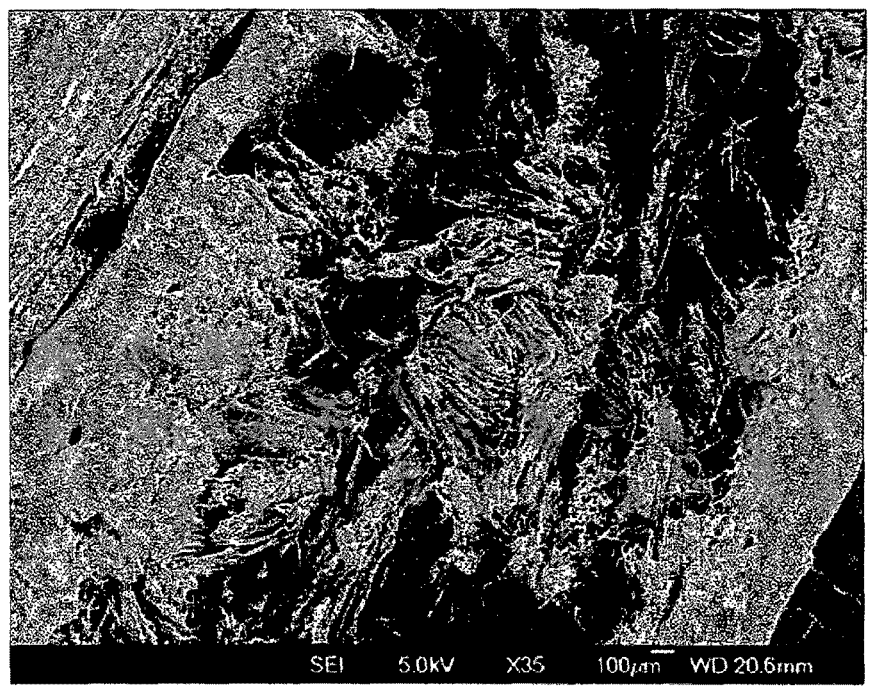
FIGS. 6A and 6B, 7A and 7B, and 8A and 8B are SEM images of lugs formed by the first pressure impregnating embodiment of the invention and as referred to further in the subsequent description of experimental work.
Figure 6B:
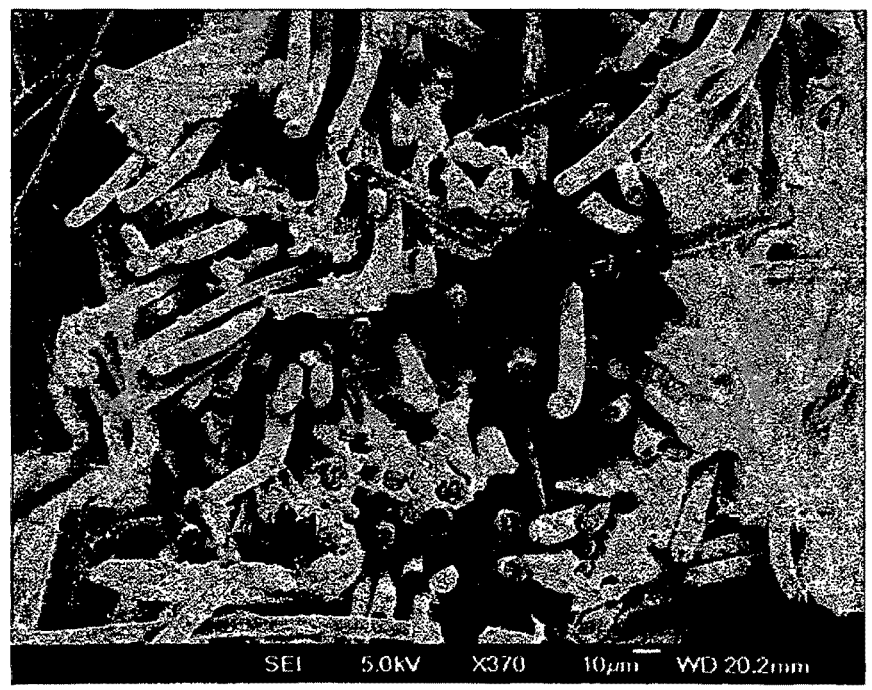
Figure 7A:
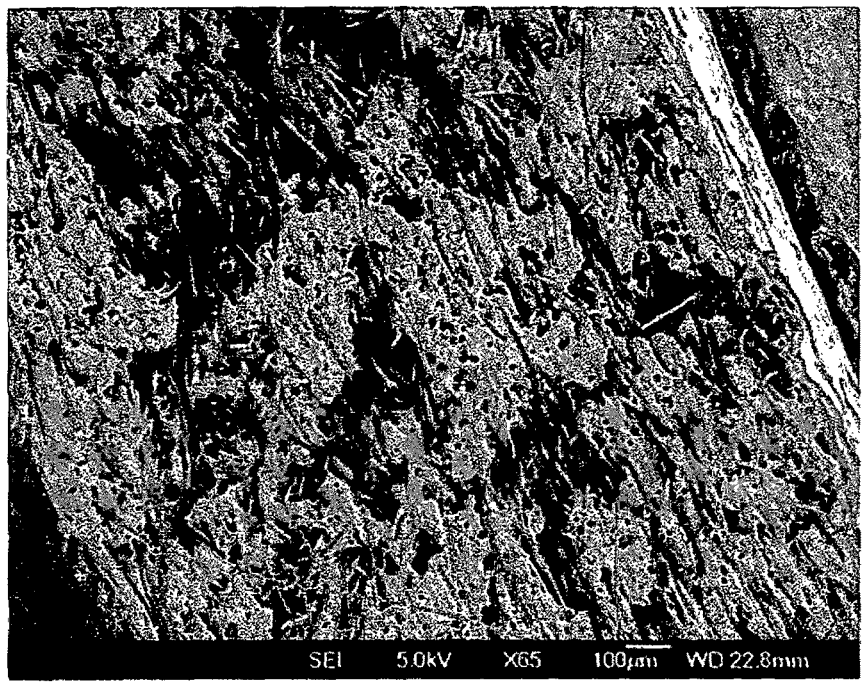
Figure 7B:
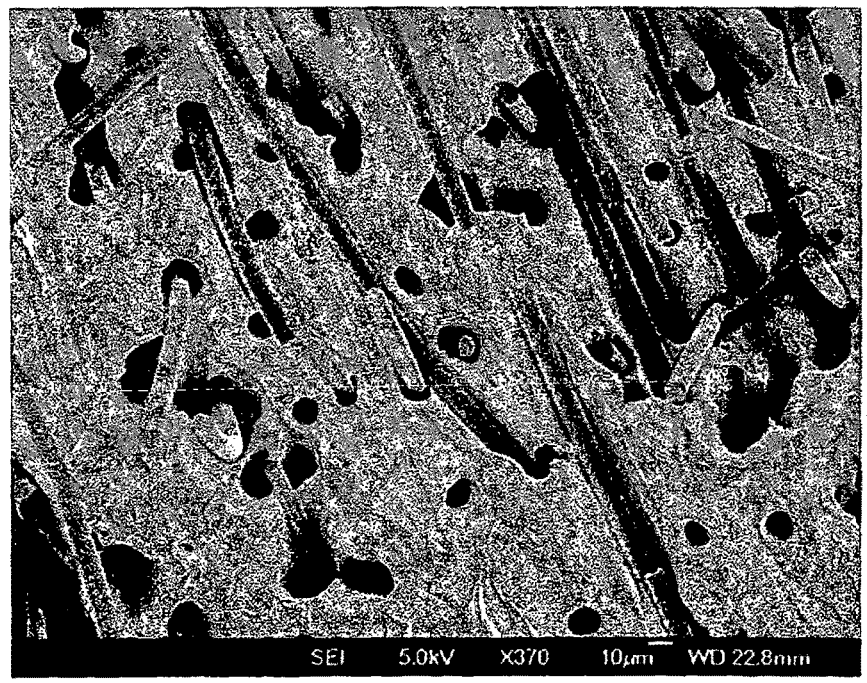
Figure 8A:
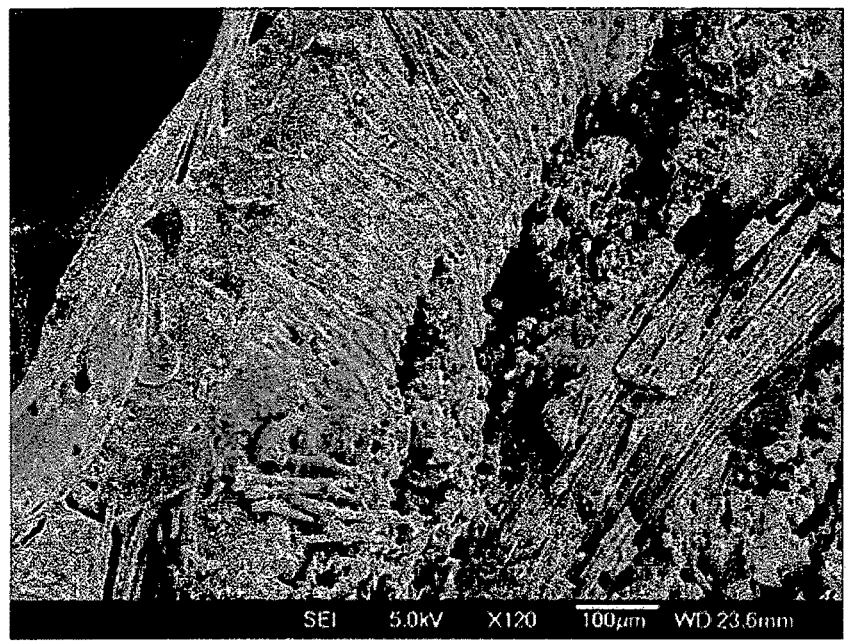
Figure 8B:
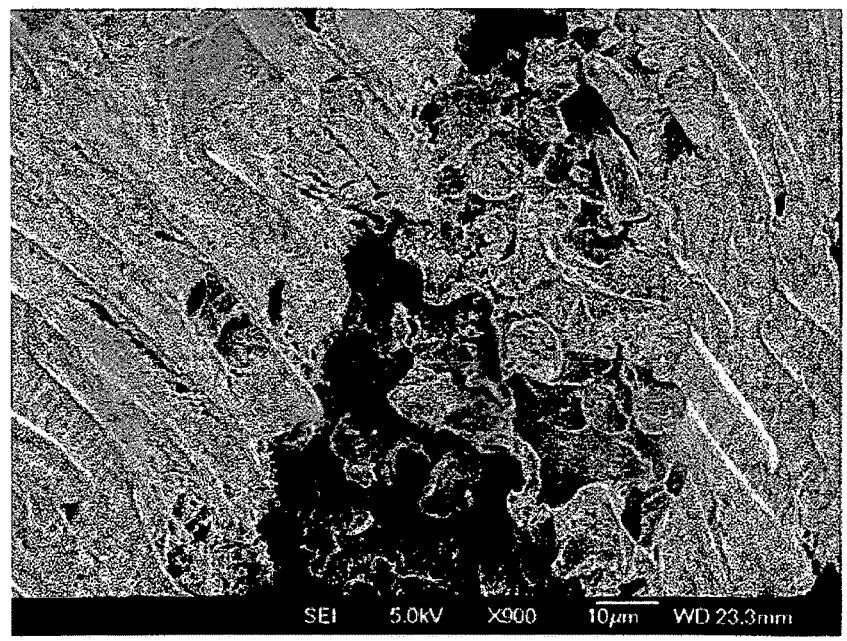

To obtain Scanning Electron Microscope (SEM) images of the insides of the lug region, the lugs were dipped in liquid Nitrogen and cleaved post formation. FIGS. 6A and 6B are a set of SEM images from a lug on a woven material with lead injected at a pressure of 10 bar. FIGS. 7A and 7B are another set of SEM images from a lug on a felted material with lead injected again at a pressure of 10 bar. Similarly FIGS. 8A and 8B are a set of SEM images from a lug on woven material with lead injected at a pressure of 10 bar with an epoxy applied to the top of the lug. FIGS. 6B, 7B, and 8B are at higher magnification than FIGS. 6A, 7A, and 8A. In all of FIGS. 6A, 6B, 7A, 7B, 8A and 8B the pale grey material is the lead and the long fibres are carbon fibres. The highest lead penetration of the material was achieved with a carbon felt material, which is shown in the series of SEM images of FIG. 7—lead clearly surrounding each fibre with very minimal presence of voids. FIG. 7A shows full width or cross section of the lug, and FIG. 7B shows a close up (higher magnification) of the carbon fibres in the Pb (the holes are where fibres have been pulled out during cleaving of the lug).

In certain embodiments to reduce electrolyte penetration into voids in the lug, potentially leading to lead conversion to lead sulphate and so a loss of conductivity, epoxy was applied to the top of the lug, to wick into the lug and prevent acid penetration. FIG. 8 shows the lug region with excellent epoxy penetration and minimal voids.

Example 2—Lug Formation

The following two samples of lugs were attached to carbon felt by edge impregnation of molten lead in the major plane of the felt generally by the method described above with reference to FIG. 15.

The first sample was on carbon felt from Heilong Jiang in China with solid volume fraction 7.2%, thickness 1.5 mm and mean diameter of fibres 13.9 μm and arc treated as described above. This lug was made of two regions that lay next to each other—first a strip of lead in a cavity along the edge of the felt and second a lead matrix around the carbon fibres of the felt at its edge. By cutting off the second area and carefully measuring its dimensions and mass, together with determining the mass of a measured area of the felt, one can calculate the voidage fraction within the matrix (see below). This voidage was 22.5%. The resistivity of the matrix was also determined by resistance measurement with a resistance meter over a measured volume of the matrix. This resistivity was 0.32 mOhm·mm, or 0.32/0.208=1.54, or 54% higher than that of pure lead at room temperature.

Figure 19:
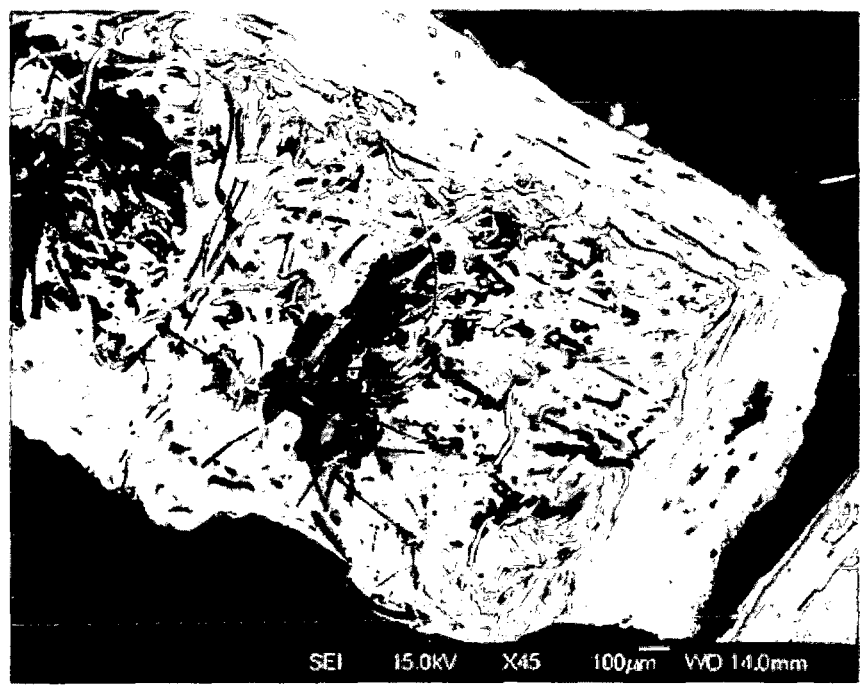
Figure 20:

FIG. 19 is an SEM image of this sample, showing holes where fibres have been pulled out during brittle fracture using cryogenic conditions, but otherwise shows lead surrounding most fibres. Two parts show some localised lack of lead, where fibres were drawn together.

Figure 21:
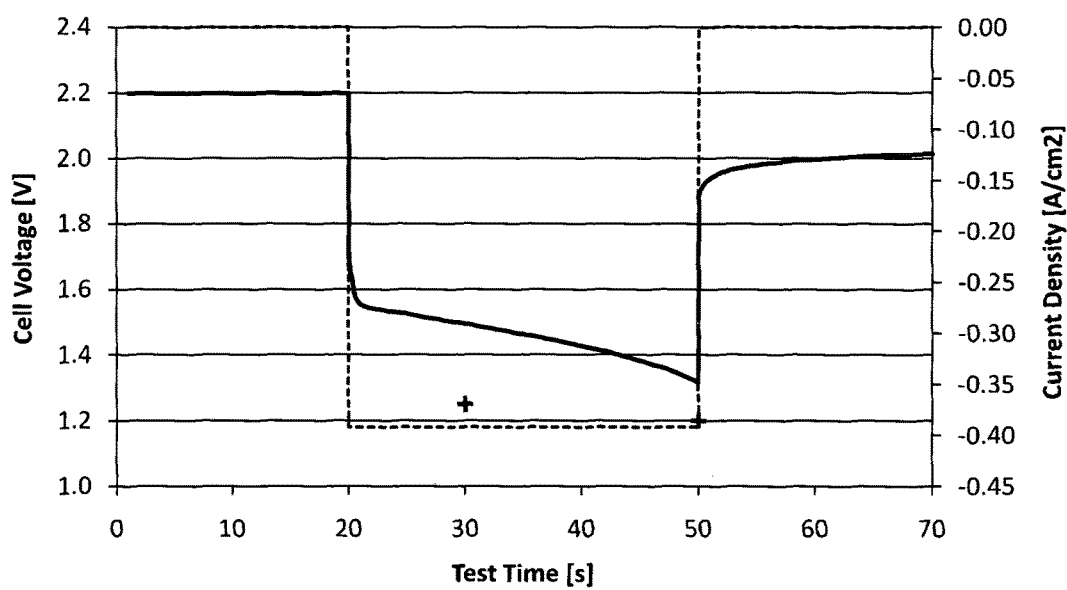
FIG. 21 shows results of CCA performance testing referred to in the subsequent description of experimental work.

FIG. 21 is an SEM image of a second lug sample produced in the same way but on carbon felt from SGL in Germany with solid volume fraction of 4.6%, 2.5 mm thick and mean fibre diameter of 9.1 μm also arc treated. This was infiltrated as with the first sample yielding a higher voidage fraction of 41% and resistivity of 0.61 mOhm·mm, or almost 3 times that of pure lead. The fracture surface shows large areas of fibres that are not contacting lead.

The connection resistances of both samples were <50 mOhms.)

The methods of measurement used were as follows:
Resistivity:

Strips of the connector where carbon felt were surrounded by lead, were cut off with a guillotine, and the ends were held by the clamps of a resistance meter. The length/between the clamps and the observed cross-sectional area A were used in the expression Resistivity=(Resistance)(Area)/(length) to calculate the resistivity.

Voidage:

The strips were weighed and the mass divided by the area to get an overall mass areal density. The same was done for samples of the carbon felt to obtain a carbon areal density, and this was subtracted from the first to obtain the lead areal density. Dividing this by the density of pure lead and by the thickness of the felt yielded the volume fraction of lead in the composite strips. Thus the voidage was obtained by subtracting both the lead volume fraction and the carbon volume fraction from 1.0, the total volume fraction.

Resistance:

Aluminium bars 8 mm square were used for contacts onto the carbon felt, one each side of the felt, with a standard contact force provided by the clamps of the resistance meter. Two pairs of such contacts were spaced at difference distances (10 to 80 mm) and 5 resistances were recorded at different distances over this range. The closely linear plot of resistance versus distance provided a slope (which yielded the resistivity of the felt when multiplied by the cross-sectional area) and an intercept, which was twice the contact/felt resistance. Then one set of contacts were used on an electrode with a connector on one end, with again different placings of the contacts along the electrode, and the other meter clamp attached to the lead tab at one end of the connector. A plot of resistance versus distance again gave a linear plot, with intercept equal to the sum of one contact/felt resistance plus the electrode connector resistance we require. Thus the latter was obtained by subtraction of the contact/felt resistance.

Example 3—Pb-Acid Cell CCA Performance with Electrode Comprising Lug

Electrode & Cell Construction:

An electrode was constructed from arc-treated carbon fibre felt having a specific weight of 238 g/m², a thickness of 2.93 mm, and a carbon volume fraction ~5.8%. After arc-treatment the felt had a specific weight of 204 g/m², was 2.5 mm thick, and had a carbon volume fraction ~5.7%. The carbon felt section was rectangular in shape and had previously had a Pb lug formed along one edge by edge impregnation of molten lead in the major plane of the felt generally by the method described above with reference to FIG. 15, so that Pb material of the lug penetrated fully through the lug zone of the carbon felt material from one side to the other.

Paste was prepared with 19.5 g of leady oxide having ~5.1% Pb content, 3.36 g of diluted sulphuric acid, 2.24 g of Vanisperse A as an expander and water solution to achieve 0.10 wt % of expander in the prepared paste, and 0.16 g of Barium Sulphate. The paste was mixed in a bath for 2 minutes with ultrasound at a frequency of 54 kHz.

The electrode was pasted with an even distribution of paste, also under ultrasound vibration on for ~1 min, via an ultra-sound vibrating plate until a majority of the paste had penetrated into the felt. The paste was applied to the electrode so that it contacted the lug Pb along the length of the boundary between the lug Pb and the non-lug Pb impregnated carbon felt (not only at the surface on either side but also through the thickness of the carbon felt material at this boundary). The total amount of mass loaded into the carbon felt was 18.15 g where the achieved capacity (low current discharging) was 2.52 Ah (i.e. 61% (68.2%) of the theoretical capacity). The pasted electrode active area (excluding the lug) had dimensions: length of 60.6 mm, width of 43.3 mm, and thickness of 2.52 mm Therefore the achieved lead loading per volume (pasted density of the electrode based on the mass loaded on to the electrode) was about 2.62 g/cm$^3$ The electrode was then built into a test cell, as a negative was sandwiched between two (one on each side) traditional positive plates of comparable size and subjected to formation charging.

Testing & Results:

The cell was subjected to SAE −18° C. CCA (cold cranking amps) tests. In particular an automotive battery should be able to deliver high current for engine starting, at low temperature, and a CCA test tests the ability of a battery to do so. Test currents were 310 mA/cm2 opposed electrode area, respectively. Having successfully passed the 310 mA/cm2 test, the electrode pasted right up to the lug was further tested at successively higher currents, eventually achieving a rating of 390 mA/cm2. FIG. 21 shows result of the CCA performance test and shows that the electrode had very good CCA performance.

The foregoing describes the invention including preferred forms thereof and alterations and modifications as will be obvious to one skilled in the art are intended to be incorporated in the scope thereof as defined in the accompanying claims.

The invention claimed is:

1. A lead acid battery or cell including at least one electrode comprising as a current collector a conductive fibre material having an average interfibre spacing of less than 100 microns, comprising an electrically conductive lug material pressure impregnated into a lug zone part of the fibre material surrounding and/or penetrating the fibres and forming an electrical connection to the fibre material in said lug zone and providing a lug for external connection of the electrode element, and comprising an active material in at least a part of the conductive fibre material other than in said lug zone, and wherein a surface to volume ratio of Pb particles in the active material is at least about 3 times greater than a surface to volume ratio of lug material in the lug zone.

2. A lead acid battery or cell according to claim 1 wherein the surface to volume ratio of Pb particles in the active material is at least about 10 times greater than a surface to volume ratio of lug material in the lug zone.

3. A lead acid battery or cell according to claim 1 wherein the surface to volume ratio of Pb particles in the active material is greater than about 2 m$^2$/cm$^3$ and the surface to volume ratio of lug material in the lug zone is less than about 0.5 m$^2$/cm$^3$.

4. A lead acid battery or cell according to claim 1 wherein the surface to volume ratio of Pb particles in the active material is greater than about 1 m$^2$/cm$^3$ and the surface to volume ratio of lug material in the lug zone is less than about 0.5 m$^2$/cm$^3$.

5. A lead acid battery or cell according to claim 1 wherein the lug material comprises a metal that is either Pb or a Pb alloy.

6. A hybrid automotive vehicle comprising a battery according to claim 1.

7. A lead acid battery or cell according to claim 1 wherein active material contacts the lug where the fibre material enters the lug, and electrically connects direct to the lug.

8. A lead-acid battery or cell according to claim 1 in which the electrical resistance of the electrical connection between the lug material and the conductive fibre material in said lug zone is less than the resistance of the active material by at least 10% when the battery or cell is 10% charged.

* * * * *